United States Patent Office 3,074,892
Patented Jan. 22, 1963

3,074,892
SPACE DEODORANT COMPOSITION AND
METHOD OF USING SAME
Kurt Kulka, New York, N.Y., assignor to Fritzsche Brothers, Inc., New York, N.Y., a corporation of New York
No Drawing. Filed May 9, 1960, Ser. No. 27,966
7 Claims. (Cl. 252—305)

This invention relates to deodorization of spaces and more particularly to methods and compositions for deodorization of spaces.

Various methods and substances have been utilized for the deodorization of malodors arising in kitchens, bathrooms, sickrooms, smoke-filled living rooms and spaces saturated with odors stemming from perspiration of men and household pets. Some of these methods and deodorants have depended upon the masking of the malodors by the impairment of smell. The use of formaldehyde is an example of such masking. Other methods involve superimposing the malodor with another stronger odor. Still other methods employ masking by neutralization with certain odoriferous compositions which have the property when added to a malodor of affecting a weaker odor instead of an enhanced odor as might be expected by such addition. All of these methods as well as those utilizing the adsorption of the malodors on surfaces of materials such as carbon or those entailing the oxidation of the malodor have serious drawbacks. The adsorption of malodors is not practical and is almost impossible to apply without specialized equipment in the deodorization of a room since the gaseous content of the room must be brought in contact with the solid sorption medium. To be sure, deodorization utilizing oxidation is effective but deodorization employing oxidation is impractical and might even present problems of fire hazard and toxicity. The masking by impairing the sense of smell usually produces significant irritation of the smelling nerves. On the other hand, superimposing one odor over the malodor frequently results in a combined sickening odor which is sometimes more repellant than the malodor itself. Finally, masking by neutralization is effective because of the large amount of diversified malodors which are encountered in the deodorization of spaces.

In accordance with this invention, deodorization of a space is effected with a deodorant which does not impair the sense of smell and which, at the level of use, is not toxic to man and domesticated animals. The action of the deodorants of this invention does not depend upon superimposing the malodor with another, masking the malodor by neutralization or adsorption or oxidation of the malodor. Rather, the compositions employed as deodorants in the practise of this invention are capable of undergoing chemical reactions with a great number of functional groups such as those contained in some of the components of the malodors frequently encountered in spaces.

An object of this invention is to deodorize a space effectively and efficiently by chemical reactions with the malodors.

This invention involves the deodorization of a space by spraying into the space a deodorant comprising a compound having an activated methylene group. The compound having an activated methylene group may be an ester of a β-keto carboxylic acid, a diketone in which the carbonyl groups are separated by a methylene group or an ester of malonic acid.

If the compound having the activated methylene group is an ester of a β-keto carboxylic acid or an ester of malonic acid, it may be an alkyl, alkylene, aryl or aralkyl ester such as 2-ethylhexyl-aceto-acetate; geranyl aceto-acetate; anisyl-aceto-acetate; benzyl-aceto-acetate; ethyl-benzoyl acetate; n-hexyl-benzoyl acetate; and di-n-hexyl-malonate. If the compound is a diketone, it may be represented by the following formula:

$$R-CO-CH_2-CO-R_1$$

in which R is an alkyl, aryl or aralkyl group and $R_1$ is an alkyl group, such as a methyl group or an aryl or other aromatic group. Examples of such diketones are 2,4-pentadione; 1-phenyl-1,3-butadione; 1-phenyl-1,3-hexadione; and lauroyl acetone.

The compound is usually propelled by a solvent such as an alcohol, a glycol or a hydrocarbon, or a propellant, or both, as commonly used in the "aerosol" type of spray. Other spray type equipment may be used, such as atomizers or household sprayers. In such cases, air would be the customary propellant. The propellant which may also be the solvent for the compound having the activated methylene group is usually gaseous under normal conditions of pressure and temperature but is adapted to be non-gaseous at normal temperatures by application of pressure. Examples of propellants are nitrogen and halogenated hydrocarbons such as trichloro-mono-fluoro-methane and dichloro-difluoromethane.

The esters having the activated methylene group employed as a deodorant in the practise of this invention are prepared by conventional methods such as esterification of an alcohol with an acid having the activated methylene group, by an exchange reaction of a lower molecular weight ester of the compound having the activated methylene group with a higher alcohol in which the formed lower alcohol is distilled off, or by the reaction of the acyl chloride of the acid having the activated methylene group with the alcohol. Desirably, the alcohol reactant has at least 4 carbon atoms.

The diketones having an activated methylene group employed as a deodorant in the practise of this invention may be produced by various methods; for example, by the "Claisen acylation" method using sodium hydride in accordance with the procedure of F. W. Swamer and C. A. Hauser described in the Journal of the American Chemical Society, vol. 72, pp. 1352–1356 (1950).

The concentration of the compound having the activated methylene group in the propellant may vary over wide limits. Usually at least 0.5 or 1% and up to 5% or 8% of the compound having the activated methylene group is desirably employed and generally at least 75% or 80% of the propellant is preferably used. In most situations, higher concentration of the compound may be used. Instead of a single compound having an activated methylene group, a plurality of such compounds may be employed.

The characteristics of the compound having the activated methylene group render them especially effective deodorants in the practise of this invention. These compounds are substantially non-irritating; they generally lend themselves well to be perfumed, giving the final product a desired odoriferous note if required. The compounds having the activated methylene group, moreover, are miscible with usual propellants and solvents employed for spraying. Finally, they are stable under normal conditions of use.

While the exact mechanism of reaction of the compounds of the deodorants of this invention is not conclusively proved, it is believed that, if a propellant containing such a compound is introduced into a space containing a malodor, such compound which is highly activated because it is released in a finely divided state, readily undergoes chemical reaction with the components of the malodors. Since such compounds react readily with many functional groups, the malodors containing such functional groups are reacted with the compound to form compositions which are devoid of the malodor from which they are derived.

The compounds used in the practise of this invention as such or these compounds with a solvent and/or a propellant may be augmented by other materials such as mono or polyhydric alcohols, hydrocarbons, materials having bactericidal properties and perfumes.

The deodorants of this invention may be prepared in the same manner as other aerosol compositions are produced, such as aerosol parasiticides described, for example, in U.S. Patent #2,321,023, granted to the Secretary of Agriculture as assignee of L. D. Goodhue et al. on June 8, 1943. In the practice of the present invention, a compatible propellant should be utilized and, instead of the parasiticide of the Goodhue et al. patent, there is employed a compound having an activated methylene group with other desired component or components.

A more comprehensive understanding of this invention is obtained by reference to the following examples:

*Example 1*

A room deodorant is prepared, having the following composition:

1 part by weight of 2-ethylhexyl-acetoacetate
12 parts by weight of isopropyl alcohol
4.0 parts by weight of triethylene glycol
3.0 parts by weight of propylene glycol
80.0 parts by weight of a mixture of equal parts of trichloro-monofluoro-methane and dichloro-difluoromethane The composition is placed in an aerosol dispenser. Alternatively, it may be employed in a household spray using a solvent, such as isopropyl alcohol or an alkane but omitting the halogenated alkane propellant.

The 2-ethylhexyl-acetoacetate was prepared as follows: There was placed in a distillation flask equipped with a 1½ Vigreux column the following reactants:

143 g. 2-ethylhexyl alcohol
143 g. methyl-acetoacetate

The formed methanol was distilled off and the desired ester obtained by distillation in an 89% yield of the theoretical. It boiled at 120–121° C. at 8 mm. The R.I. at 20° C. was 1.4429.

*Example 2*

A room deodorant is prepared, having the following composition:

1 part by weight of geranyl-acetoacetate
12 parts by weight of isopropyl alcohol
4.0 parts by weight of triethylene glycol
3.0 parts by weight of propylene glycol
80.0 parts by weight of a mixture of equal parts of trichloro-monofluoro-methane and dichloro-difluoromethane The composition is placed in an aerosol dispenser.
The geranyl-acetoacetate was prepared as follows:
There was placed in a distillation flask equipped with a 1½ foot Vigreux column the following reactants:

154 g. geraniol
174 g. methyl acetoacetate

The methanol was distilled off and the desired ester obtained by distillation in an 84% yield of the theoretical. It boiled at 158–159° C. at 4 mm. The R.I. at 20° C. was 1.5214.

*Example 3*

A room deodorant is prepared, having the following composition:

1 part by weight of anisyl acetoacetate
12 parts by weight of isopropyl alcohol
4.0 parts by weight of triethylene glycol
3.0 parts by weight of propylene glycol
80.0 parts by weight of a mixture of equal parts of trichloro-monofluoro-methane and dichloro-difluoromethane The composition is placed in an aerosol dispenser.
The anisyl acetoacetate was prepared as follows:
There was placed in a distillation flask equipped with a 1½ foot Vigreux column the following reactants:

138 g. anisyl alcohol
174 g. methyl acetoacetate

The methanol was distilled off and the desired ester obtained in an 84% yield of the theoretical by distillation. It boiled at 158–159° C. at 4 mm. The R.I. at 20° C. was 1.5214.

*Example 4*

A room deodorant is prepared, having the following composition:

.5 part by weight of commercially available ethyl benzoyl acetate
12.5 parts by weight of isopropyl alcohol
4.0 parts by weight of triethylene glycol
3.0 parts by weight of propylene glycol
80.0 parts by weight of a mixture of equal parts of trichloro-monofluoro-methane and dichloro-difluoromethane The composition is placed in an aerosol dispenser.

*Example 5*

A room deodorant is prepared, having the following composition:

.5 part by weight of isoamyl benzoyl acetate
12.5 parts by weight of isopropyl alcohol
4.0 parts by weight of triethylene glycol
3.0 parts by weight of propylene glycol
80.0 parts by weight of a mixture of equal parts of trichloro-monofluoro-methane and dichloro-difluoromethane The composition is placed in an aerosol dispenser.
The isoamyl benzoyl acetate was prepared as follows:
There was placed in a distillation flask equipped with a 1½ foot Vigreux column the following reactants:

96 g. ethyl benzoyl acetate
58 g. isoamyl alcohol

The formed ethyl alcohol was distilled off and the desired ester obtained in an 85.4% yield of the theoretical by distillation. It boiled at 155–158° C. at a vacuum of 5 mm. The R.I. at 20° C. was 1.5140.

*Example 6*

A room deodorant is prepared, having the following composition:

2 parts by weight of di-n-hexyl-malonate
11.0 parts by weight of isopropyl alcohol
4.0 parts by weight of triethylene glycol
3.0 parts by weight of propylene glycol
80.0 parts by weight of a mixture of equal parts of trichloro-monofluoro-methane and dichloro-difluoromethane The composition is placed in an aerosol dispenser.
The di-n-hexyl malonate was prepared as follows:
There was placed in a distillation flask equipped with a 1½ Vigreux column the following reactants:

88 g. di-ethyl malonate
114 g. n-hexyl-alcohol

The formed ethyl alcohol was distilled off and the desired ester obtained in an 80% yield of the theoretical by distillation. It boiled at 140–142° C. at 2 mm. vacuum.

Example 7

A room deodorant is prepared, having the following composition:

.5 part by weight of lauroylacetone
12.5 parts by weight of isopropyl alcohol
4.0 parts by weight of triethylene glycol
3.0 parts by weight of propylene glycol
80.0 parts by weight of a mixture of equal parts of trichloro-monofluoro-methane and dichloro-difluoro-methane The composition is placed in an aerosol dispenser.

The lauroyl-acetone was prepared from lauryl acetate and acetone by a so-called "Claisen acylation" using sodium hydride (as a commercial 50% in oil emulsion) according to the procedure of F. W. Swamer and C. A. Hauser described in the Journal of the American Chemical Society, vol. 72, pp. 1352–1356 (1950).

From the above illustrations and examples, it is clear that the active compounds having less than 16 carbon atoms effectuate deodorization when employed in the methods and compositions of this invention.

The efficiency of the room deodorants was tested in various experiments. Two compositions of malodors were prepared in accordance with the formula developed by the General Services Administration of the United States Government. One of these malodors was a so-called tobacco smoke odor, while the other comprised the kitchen odor. In the testing, two separate, trained odor jury panels of three males and two females, and two males and three females first determined that the odor test rooms employed were clean and odorless. Into one of the test rooms there was introduced a three second aerosol spray of the malodor under test; e.g. the kitchen odor, while a three second aerosol spray of the other malodor under test was introduced into another room. This procedure was followed in two other rooms which were used as controls. The deodorants containing the compound having an activated methylene group was introduced in the form of a three second aerosol spray into the room containing each of the malodors. Using the trained jury panels of three males and two females and that of three females and two males, the room sprayed with the deodorant was compared with the room containing the malodor without any introduction of the deodorant, one minute after application of the deodorant aerosol and five minutes after the application of the deodorant aerosol. It was found that in the room in which the deodorant was introduced, there was retained a faint but characteristic odor of the deodorant. There was a marked reduction of the malodor level in each of the rooms in which the deodorant was introduced as specified in accordance with the Federal specification of the General Services Administration. The malodors in the control rooms in which no deodorant was introduced persisted most markedly in the same periods that the deodorized rooms showed such striking improvement.

What is claimed is:

1. The method of deodorizing a space which comprises spraying into said space a compound having less than 16 carbon atoms and being selected from the class consisting of alkyl, alkylene, aryl hydrocarbon and aralkyl hydrocarbon esters of $\beta$-keto carboxylic acids; alkyl, alkylene, aryl hydrocarbon and aralkyl hydrocarbon esters of malonic acid; and diketones having the following formula:

$$R-CO-CH_2-CO-R_1$$

in which R is selected from the class consisting of alkyl, aryl hydrocarbon and aralkyl hydrocarbon groups and $R_1$ is selected from the class consisting of alkyl and aromatic groups.

2. The method of deodorizing a space which comprises spraying into said space finely divided particles of a solution under pressure comprising a compound in a solvent having a vapor pressure such that it boils under atmospheric pressure, said compound having less than 16 carbon atoms and being selected from the class consisting of alkyl, alkylene, aryl hydrocarbon and aralkyl hydrocarbon esters of $\beta$-keto carboxylic acids; alkyl, alkylene, aryl hydrocarbon and aralkyl hydrocarbon esters of malonic acid; and diketones having the following formula:

$$R-CO-CH_2-CO-R_1$$

in which R is selected from the class consisting of alkyl, aryl hydrocarbon and aralkyl hydrocarbon groups and $R_1$ is selected from the class consisting of alkyl and aromatic groups.

3. A deodorant comprising a compound and a propellant gaseous under normal conditions of temperature and pressure but capable of being maintained in a non-gaseous state at normal temperature by the application of pressure, said compound having less than 16 carbon atoms and being selected from the class consisting of alkyl, alkylene, aryl hydrocarbon and aralkyl hydrocarbon esters of $\beta$-keto carboxylic acids; alkyl, alkylene, aryl hydrocarbon and aralkyl hydrocarbon esters of malonic acid; and diketones having the formula:

$$R-CO-CH_2-CO-R_1$$

in which R is selected from the class consisting of alkyl, aryl hydrocarbon and aralkyl hydrocarbon groups and $R_1$ is selected from the class consisting of alkyl and aromatic groups.

4. A deodorant in accordance with claim 3 in which the propellant is a halogenated alkane.

5. A deodorant comprising a compound and a propellant gaseous under normal conditions of temperature and pressure but capable of being maintained in a non-gaseous state at normal temperature by the application of pressure, said compound having less than 16 carbon atoms and being selected from the class consisting of alkyl, alkylene, aryl hydrocarbon and aralkyl hydrocarbon esters of $\beta$-keto carboxylic acids.

6. A deodorant comprising a compound and a propellant gaseous under normal conditions of temperature and pressure but capable of being maintained in a non-gaseous state at normal temperature by the application of pressure, said compound having less than 16 carbon atoms and being selected from the class consisting of alkyl, alkylene, aryl hydrocarbon and aralkyl hydrocarbon esters of malonic acid.

7. A deodorant comprising a compound and a propellant gaseous under normal conditions of temperature and pressure but capable of being maintained in a non gaseous state at normal temperature by the application of pressure, said compound having less than 16 carbon atoms and being a diketone having the following formula:

$$R-CO-CH_2-CO-R_1$$

in which R is selected from the class consisting of alkyl aryl hydrocarbon, and aralkyl hydrocarbon groups and $R_1$ is selected from the class consisting of alkyl and aromatic groups.

References Cited in the file of this patent

Moncrieff: The Chemistry of Perfumery Materials 1949, United Trade Press, London, England, pages 12 and 134.

Kenkichi: Chem. Abst., vol. 51, 1957, page 636(d).

UNITED STATES PATENT OFFICE
CERTIFICATE OF CORRECTION

Patent No. 3,074,892                                January 22, 1963

Kurt Kulka

It is hereby certified that error appears in the above numbered patent requiring correction and that the said Letters Patent should read as corrected below.

Column 1, line 42, for "effective" read -- ineffective --.

Signed and sealed this 3rd day of September 1963.

(SEAL)
Attest:

ERNEST W. SWIDER
Attesting Officer

DAVID L. LADD
Commissioner of Patents